Patented Feb. 1, 1938

2,106,763

UNITED STATES PATENT OFFICE 2,106,763

METHOD OF PURIFYING CRUDE EXTRACTS OF THE GERMINAL GLAND HORMONES AND OF ISOLATING THE LATTER THEREFROM

Erwin Schwenk, New York, N. Y., Max Gehrke, Birkenwerder, near Berlin, and Friedrich Hildebrandt, Hohen Neuendorf, near Berlin, Germany, assignors to Schering-Kahlbaum A. G., Berlin, Germany, a corporation of Germany No Drawing. Application May 4, 1934, Serial No. 723,928. In Germany May 5, 1933

16 Claims. (Cl. 260—131)

This invention relates to a method of purifying crude extracts of the germinal gland hormones and isolating the latter therefrom, and more particularly to a method of isolating the male sexual gland hormone and separating the same from other hormones present in the starting material.

It is an object of this invention to provide means whereby the isolation of said hormones from their starting materials is effected in a simpler and more efficient manner than was hitherto possible.

In our copending application Ser. No. 708,428, filed January 26, 1934, there is described a method of isolating the follicle hormones from urine or extracts obtained therefrom, for instance, by extraction, or from other sources, such as organs or the like, by way of their acyl derivatives, by first isolating the esters of said hormones and then saponifying the latter to the free hormones. Now it has been found that this method is suitably employed also in purifying the male sexual gland hormone and the like compounds as well as in separating the various sexual gland hormones from each other, especially the male sex hormone from the follicle hormone.

For this purpose, the starting material is subjected, in accordance with the method described in our above mentioned copending application Serial No. 708,428, to an acylating treatment. The acylation is preferably carried out in such a manner that the crude extract is first freed of most of its water and thereupon is treated with acylating agents which may be dissolved in in- different solvents.

As acylating agents may be used acid anhydrides, such as acetic acid anhydride, phthalic acid anhydride and the like, or acid chlorides, such as p-toluene sulfonic acid chloride, anthraquinone-2-carboxylic acid chloride, salicylic acid chloride and the like, and other known acylating agents. When using acid chlorides, the reaction preferably takes place in the presence of agents capable of combining with hydrochloric acid, such as pyridine and the like.

As starting material may be used extracts of urine of male or female individuals, the latter especially when in the state of advanced pregnancy, or extracts of organs containing the sexual gland hormones or any other suitable raw material. These extracts are preferably subjected to a preliminary purification process, as, for instance, the extract obtained from the urine of male individuals according to the method of Lacqueur. But also other pretreatment methods may be employed.

The following examples serve to illustrate the invention without, however, limiting the same to them.

Example 1

50 grams of an extract obtained from the urine of male individuals, having an efficiency of 10 mg. per capon unit, are dissolved in 500 cc. of toluene. A solution of 50 grams of toluene sulfonic acid chloride in toluene, containing the equivalent amount of pyridine, is added slowly to the solution of the extract, while stirring. The mixture is allowed to stand for several hours at room temperature. The pyridine chlorohydrate precipitates in the form of crystalline needles. After filtering off the latter, the solution is worked up in the usual manner. The residue remaining after evaporating the toluene is purified whereby the non-esterified products are separated from the esterified ones. Said purification may be accomplished by chemical as well as physical methods such as, for instance, fractionated recrystallization, distillation or extraction. The fraction containing most of the toluene sulfonic acid ester of the male sex hormone is saponified, whereupon a purified oily product is isolated from the saponification liquid, said purified hormone having an efficiency of 0.5 mg. per capon unit.

Example 2

When using as starting material an extract from the urine of pregnant women, instead of the extract from the urine of male individuals mentioned in Example 1, a mixture of the toluene sulfonic acid compounds of the male sex hormone, the follicle hormone, the follicle hormone hydrate, and the pregnandiol is obtained. By chemical as well as physical methods, for instance, by fractionated recrystallization, distillation, extraction and the like purified mixtures of the toluene sulfonic acid compounds of the sex hormones are isolated which after saponification are worked up in the usual manner giving the various purified components. For instance, a fraction containing mostly the ester of pregnandiol and only small amounts of follicle hormone and follicle hormone hydrate may be worked up in such a manner that the alkaline saponification solution is diluted with much water and then thoroughly extracted by means of ether. Thereupon the ethereal extract is shaken with concentrated alkali hydroxide solution. Thereby the follicle hormone is extracted and can be separated from its alkaline solution in a highly concentrated form. The remaining ethereal extract yields on concentrating by evaporation first the pregnandiol which separates in crystals while the male sex hormone is obtained in the form of a highly effective oil after evaporating the remaining ether. The follicle hormonhydrate remains, on account of its strongly acid properties, in the alkaline saponification liquid when the latter is extracted by ether. It is recovered therefrom by neutralization with carbon dioxide and extraction with ether.

Thus, it is evident that the described method is not only useful in purifying and isolating the male sex hormone from its crude extracts but also in purifying and separating the germinal gland hormones in general from their starting materials.

Of course, various changes may be made in the details disclosed in the foregoing specification without departing from the invention and from the principles set forth herein and in the claims annexed hereto.

What we claim, is:

1. A method of purifying crude extracts containing male and female germinal gland hormones having at least one hydroxyl group in the molecule and of isolating such hormones therefrom, comprising treating said extracts with acylating agents, separating the esterified from the non-esterified products by physical methods, saponifying the purified esters of the germinal gland hormones obtained and isolating the germinal gland hormones.

2. A method of purifying crude extracts containing male and female germinal gland hormones having at least one hydroxyl group in the molecule and of isolating such hormones therefrom, comprising treating said extracts with acylating agents in the presence of indifferent solvents, separating the esterified from the non-esterified products by physical methods, saponifying the purified esters of the germinal gland hormones obtained and isolating the germinal gland hormones.

3. A method of purifying crude extracts containing male and female germinal gland hormones having at least one hydroxyl group in the molecule and of isolating such hormones therefrom, comprising freeing said extracts from most of their water content, dissolving the remaining extract in indifferent solvents, treating the solution obtained with acid chlorides in the presence of products capable of combining with hydrochloric acid, separating the esterified from the non-esterified products by physical methods, saponifying the purified esters of the germinal gland hormones obtained and isolating the germinal gland hormones.

4. A method of purifying crude extracts containing male and female germinal gland hormones having at least one hydroxyl group in the molecule and of isolating such hormones therefrom, comprising freeing said extracts from most of their water content, dissolving the remaining extract in indifferent solvents, treating the solution obtained with acylating agent, separating the esterified from the non-esterified products by fractionating methods, saponifying the fractions containing the esterified products and isolating the purified germinal gland hormones from the saponification liquid.

5. A method of purifying crude extracts containing male and female germinal gland hormones having at least one hydroxyl group in the molecule and of isolating such hormones therefrom, comprising treating said extracts with acylating agents, separating the esterified from the non-esterified products by fractionating methods, saponifying the fractions containing the esterified products and isolating the purified germinal gland hormones from the saponification liquid.

6. A method of purifying crude extracts containing male and female germinal gland hormones having at least one hydroxyl group in the molecule and of isolating such hormones therefrom, comprising subjecting said extracts to a preliminary purification process, treating said extracts with acylating agents, separating the esterified from the non-esterified products by physical methods, saponifying the purified esters of the germinal gland hormones obtained and isolating the germinal gland hormones.

7. A method of purifying extracts containing the male sex hormone and of isolating the latter therefrom, comprising dissolving said extracts in indifferent organic solvents, treating the solution obtained with acylating agents, separating the esterified from the non-esterified products by physical methods, saponifying the purified ester of the male sex hormone obtained and isolating the latter from the saponification liquid.

8. A method of purifying extracts containing the male sex hormone and of isolating the latter therefrom, comprising subjecting said extracts to a preliminary purification process, dissolving the pretreated extracts in indifferent organic solvents, treating the solution obtained with acylating agents, separating the esterified from the non-esterified products by physical methods, saponifying the purified ester of the male sex hormone obtained and isolating the latter from the saponification liquid.

9. A method of purifying extracts containing the male sex hormone and of isolating the latter therefrom, comprising dissolving said extracts in indifferent organic solvents, treating the solution obtained with acid chlorides in the presence of products capable of combining with hydrochloric acid, separating the esterified from the non-esterified products by physical methods, saponifying the purified ester of the male sex hormone obtained and isolating the latter from the saponification liquid.

10. A method of producing purified germinal gland hormones having at least one hydroxyl group in the molecule, comprising treating extracts containing the same with acylating agents, separating the acylated products from the non-acylated products by physical methods, saponifying the fractions containing the acylated germinal gland hormones, subjecting the saponification liquid to the action of agents capable of separating the various hormones from each other and isolating the purified hormones.

11. A method of producing purified germinal gland hormones having at least one hydroxyl group in the molecule, comprising treating extracts containing the same with acylating agents, separating the acylated products from the non-acylated products, saponifying the fractions containing the acylated germinal gland hormones, separating and isolating the various purified hormones from the saponification liquid by a treatment with organic solvents having an alkalinity corresponding to the degree of acidity of the hormone to be separated.

12. A method of producing purified germinal gland hormones having at least one hydroxyl group in the molecule, comprising subjecting extracts containing the same to a preliminary purification process, treating said purified extracts with acylating agents, separating the acylated products from the non-acylated products by physical methods, saponifying the fractions containing the acylated germinal gland hormones, subjecting the saponification liquid to the action of agents capable of separating the various hormones from each other and isolating the purified hormones.

13. A method of purifying crude extracts containing male and female germinal gland hormones having at least one hydroxyl group in the molecule, comprising treating said extracts with toluene sulfonic acid chloride in the presence of a compound capable of combining with the liberated hydrochloric acid, separating the esterified from the non-esterified products, saponifying the purified esters of the germinal gland hormones so obtained, and isolating the germinal gland hormones.

14. A method of purifying crude extracts containing male and female germinal gland hormones having at least one hydroxyl group in the molecule, comprising treating said extracts with toluene sulfonic acid chloride in the presence of pyridine, separating the esterified from the non-esterified products, saponifying the purified esters of the germinal gland hormones so obtained, and isolating the germinal gland hormones.

15. A method of purifying crude extracts containing male and female germinal gland hormones having at least one hydroxyl group in the molecule, comprising treating said extracts with an acylating agent, separating the esterified from the unesterified products, saponifying the purified esters of the germinal gland hormones so obtained and isolating the germinal gland hormones.

16. A method of purifying crude extracts containing male and female germinal gland hormones having at least one hydroxyl group in the molecule, comprising treating said extracts with an acylating agent of the group consisting of acetic and phthalic acids and their anhydrides, p-toluene sulfonic acid chloride, anthraquinone-2-carboxylic acid chloride and salicylic acid chloride, separating the esterified from the non-esterified products, saponifying the purified esters of the germinal gland hormones so obtained and isolating the germinal gland hormones.

ERWIN SCHWENK.
FRIEDRICH HILDEBRANDT.
MAX GEHRKE.